(12) United States Patent
Qiu et al.

(10) Patent No.: US 9,051,417 B2
(45) Date of Patent: *Jun. 9, 2015

(54) METHOD FOR SOLUBILIZING CARBOXYLIC ACID-CONTAINING COMPOUND IN HYDROCARBON SOLVENT

(71) Applicant: Dow Global Technologies LLC, Midland, MI (US)

(72) Inventors: XiaoHua Sam Qiu, Midland, MI (US); Steven D. Jons, Eden Prairie, MN (US); Joseph D. Koob, Jordan, MN (US); Martin H. Peery, Bloomington, MN (US); Steven Rosenberg, Shorewood, MN (US); Abhishek Roy, Edina, MN (US); Ian A. Tomlinson, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 322 days.

This patent is subject to a terminal disclaimer.

(21) Appl. No.: 13/844,841

(22) Filed: Mar. 16, 2013

(65) Prior Publication Data

US 2014/0264162 A1    Sep. 18, 2014

(51) Int. Cl.
  *C08G 69/26* (2006.01)
  *C08G 69/00* (2006.01)
  *C07B 41/08* (2006.01)

(52) U.S. Cl.
  CPC .............. *C08G 69/00* (2013.01); *C08G 69/26* (2013.01)

(58) Field of Classification Search
  None
  See application file for complete search history.

(56) References Cited

U.S. PATENT DOCUMENTS

| | | |
|---|---|---|
| 3,304,310 A | 2/1967 | Istvan Hari et al. |
| 3,686,116 A | 8/1972 | Andre Rio |
| 3,878,109 A | 4/1975 | Ikeda et al. |
| 4,259,183 A | 3/1981 | Cadotte |
| 4,265,745 A | 5/1981 | Kawaguchi et al. |
| 4,277,344 A | 7/1981 | Cadotte |
| 4,529,646 A | 7/1985 | Sundet |
| 4,606,943 A | 8/1986 | Rak et al. |
| 4,626,468 A | 12/1986 | Sundet |
| 4,643,829 A | 2/1987 | Sundet |
| 4,719,062 A | 1/1988 | Sundet |
| 4,758,343 A | 7/1988 | Sasaki et al. |
| 4,761,234 A | 8/1988 | Uemura et al. |
| 4,783,346 A | 11/1988 | Sundet |
| 4,812,270 A | 3/1989 | Cadotte et al. |
| 4,830,885 A | 5/1989 | Tran et al. |
| 4,888,116 A | 12/1989 | Cadotte et al. |
| 4,948,507 A | 8/1990 | Tomaschke |
| 4,950,404 A | 8/1990 | Chau |
| 4,960,517 A | 10/1990 | Cadotte |
| 5,015,380 A | 5/1991 | Sundet |
| 5,015,382 A | 5/1991 | Sundet |
| 5,019,264 A | 5/1991 | Arthur |
| 5,051,178 A | 9/1991 | Uemura et al. |
| 5,160,619 A | 11/1992 | Yamaguchi et al. |
| 5,246,587 A | 9/1993 | Tomaschke |
| 5,254,261 A | 10/1993 | Tomaschke et al. |
| 5,290,452 A | 3/1994 | Schucker |
| 5,336,409 A | 8/1994 | Hachisuka et al. |
| 5,510,527 A | 4/1996 | Hachisuka et al. |
| 5,576,057 A | 11/1996 | Hirose et al. |
| 5,582,725 A | 12/1996 | McCray et al. |
| 5,593,588 A | 1/1997 | Kim et al. |
| 5,614,099 A | 3/1997 | Hirose et al. |
| 5,616,249 A | 4/1997 | Hodgdon |
| 5,693,227 A | 12/1997 | Costa |
| 5,733,602 A | 3/1998 | Hirose et al. |
| 5,736,371 A | 4/1998 | Samain et al. |
| 5,744,039 A | 4/1998 | Itoh et al. |
| 5,783,079 A | 7/1998 | Kumano et al. |
| 5,843,351 A | 12/1998 | Hirose et al. |
| 5,876,602 A | 3/1999 | Jons et al. |
| 5,989,426 A | 11/1999 | Hirose et al. |
| 6,024,873 A | 2/2000 | Hirose et al. |
| 6,086,764 A | 7/2000 | Linder et al. |
| 6,162,358 A | 12/2000 | Li et al. |
| 6,280,853 B1 | 8/2001 | Mickols |
| 6,337,018 B1 | 1/2002 | Mickols |
| 6,406,626 B1 | 6/2002 | Murakami et al. |
| 6,464,873 B1 | 10/2002 | Tomaschke |

(Continued)

FOREIGN PATENT DOCUMENTS

| | | |
|---|---|---|
| CN | 1035338 | 7/1997 |
| CN | 102219673 | 10/2011 |

(Continued)

OTHER PUBLICATIONS

Marvel, et al., Journal of Organic Chemistry, vol. 18, No. 12, (1953) 1664-1669.

(Continued)

*Primary Examiner* — Joseph D Anthony
(74) *Attorney, Agent, or Firm* — Edward W. Black

(57) ABSTRACT

A method for increasing the solubility of a hydrocarbon compound comprising an aliphatic or arene moiety substituted with at least one acyl halide and at least one carboxylic acid functional group within a hydrocarbon solvent, wherein the method includes the step of preparing a solution comprising: at least 80 v/v % of the hydrocarbon solvent, the hydrocarbon compound, and a tri-hydrocarbyl phosphate compound, wherein the concentration of the hydrocarbon compound is greater than its solubility limit within the solvent but less than its solubility limit in the solution and the hydrocarbon.

11 Claims, No Drawings

(56) References Cited

U.S. PATENT DOCUMENTS

| | | |
|---|---|---|
| 6,521,130 B1 | 2/2003 | Kono et al. |
| 6,562,266 B2 | 5/2003 | Mickols |
| 6,723,241 B2 | 4/2004 | Mickols |
| 6,723,422 B1 | 4/2004 | Hirose et al. |
| 6,878,278 B2 | 4/2005 | Mickols |
| 7,279,097 B2 | 10/2007 | Tomioka et al. |
| 7,806,275 B2 | 10/2010 | Murphy et al. |
| 7,815,987 B2 | 10/2010 | Mickols et al. |
| 7,882,963 B2 | 2/2011 | Mickols et al. |
| 7,905,361 B2 | 3/2011 | Niu et al. |
| 7,918,349 B2 | 4/2011 | Mickols et al. |
| 8,147,735 B2 | 4/2012 | Buschmann |
| 8,177,978 B2 | 5/2012 | Kurth et al. |
| 2008/0185332 A1 | 8/2008 | Niu et al. |
| 2009/0071903 A1 | 3/2009 | Nakatsuji et al. |
| 2009/0107922 A1 | 4/2009 | Zhang et al. |
| 2009/0220690 A1 | 9/2009 | Niu et al. |
| 2009/0272692 A1 | 11/2009 | Kurth et al. |
| 2010/0062156 A1 | 3/2010 | Kurth et al. |
| 2011/0005997 A1 | 1/2011 | Kurth et al. |
| 2011/0049055 A1 | 3/2011 | Wang et al. |
| 2011/0220569 A1 | 9/2011 | Mickols et al. |
| 2012/0248027 A1 | 10/2012 | Sasaki et al. |
| 2012/0261332 A1 | 10/2012 | Takagi et al. |
| 2012/0261344 A1 | 10/2012 | Kurth et al. |
| 2012/0305473 A1 | 12/2012 | Ogawa et al. |
| 2013/0089727 A1 | 4/2013 | Nilsen et al. |
| 2013/0126419 A1 | 5/2013 | Ogawa et al. |
| 2013/0256215 A1 | 10/2013 | Nakatsuji et al. |
| 2014/0199483 A1* | 7/2014 | Roy et al. .............. 427/244 |
| 2014/0206900 A1* | 7/2014 | Qiu et al. .............. 562/495 |
| 2014/0264161 A1* | 9/2014 | Roy et al. .............. 252/182.15 |
| 2014/0264162 A1* | 9/2014 | Qiu et al. .............. 252/182.15 |
| 2014/0272134 A1* | 9/2014 | Roy et al. .............. 427/244 |

FOREIGN PATENT DOCUMENTS

| | | |
|---|---|---|
| DE | 2530562 | 1/1977 |
| EP | 0302149 | 2/1989 |
| JP | 53146275 | 12/1978 |
| WO | 2009129354 | 10/2009 |
| WO | 2010042250 | 4/2010 |
| WO | 2010120326 | 10/2010 |
| WO | 2010120327 | 10/2010 |
| WO | 2011105278 | 9/2011 |
| WO | 2012020680 | 2/2012 |
| WO | 2012090862 | 7/2012 |
| WO | 2012102942 | 8/2012 |
| WO | 2012102943 | 8/2012 |
| WO | 2012102944 | 8/2012 |
| WO | 2013032586 | 3/2013 |
| WO | 2013048762 | 4/2013 |
| WO | 2013048763 | 4/2013 |
| WO | 2013048764 | 4/2013 |
| WO | 2013048765 | 4/2013 |
| WO | 2013103666 | 7/2013 |
| WO | 2014014662 | 1/2014 |
| WO | 2014014663 | 1/2014 |
| WO | 2014014664 | 1/2014 |
| WO | 2014014666 | 1/2014 |
| WO | 2014014668 | 1/2014 |
| WO | 2014014669 | 1/2014 |

OTHER PUBLICATIONS

Dow Global Technologies LLC, PCT/US13/020072, filed Jan. 3, 2013.

Li et al, Polyamide thin fim composite membranes prepared from isomeric biphenyl tetrraacyl chloride and m-phenylenediamine, Journal of Membrane Science 315, (2008) 20-27.

U.S. Appl. No. 61/818,934, filed May 3, 2014, Composite Polyamide Membrane Derived From an Aliphatic Acyclic Tertiary Amine Compound, Paul Mou et al.

International Application PCT/US2014/010123, filed Jan. 3, 2014, Composite Polyamide Membrane Made Using Substituted Benzamide Monomer, Abhishek L. Roy, et al.

* cited by examiner

METHOD FOR SOLUBILIZING CARBOXYLIC ACID-CONTAINING COMPOUND IN HYDROCARBON SOLVENT

FIELD OF THE INVENTION

The present invention is directed toward methods for increasing the solubility of carboxylic acid-containing compounds within a variety of hydrocarbon solvents.

BACKGROUND

Compounds including carboxylic acid functional groups generally have poor solubility in hydrocarbon solvents. For example, hydrocarbon compounds including an aliphatic or arene moiety substituted with at least one acyl halide and at least one carboxylic acid functional group generally have solubilities below 0.02 weight percent in paraffinic solvents. Techniques for increasing the solubility of such compounds are desired. The resulting solutions would be useful in a variety of applications including the preparation of polyamides.

BRIEF SUMMARY OF THE INVENTION

The present invention includes a method for increasing the solubility of a hydrocarbon compound comprising an aliphatic or arene moiety substituted with at least one acyl halide and at least one carboxylic acid functional group within a hydrocarbon solvent, wherein the method comprises the step of preparing a solution comprising:
  i) at least 80 v/v % of the hydrocarbon solvent,
  ii) the hydrocarbon compound, and
  iii) a tri-hydrocarbyl phosphate compound represented by:

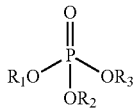

wherein $R_1$, $R_2$ and $R_3$ are independently selected from hydrogen and hydrocarbyl groups comprising from 1 to 10 carbon atoms, with the proviso that no more than one of $R_1$, $R_2$ and $R_3$ are hydrogen;
wherein the concentration of the hydrocarbon compound is greater than its solubility limit within the solvent but less than its solubility limit in the solution.

DETAILED DESCRIPTION OF THE INVENTION

The hydrocarbon compounds of the present invention include an aliphatic or arene moiety including at least one (and preferably only one) carboxylic acid functional group and at least one acyl halide functional group and are hereinafter referred to as "carboxylic acid-containing compound," "hydrocarbon compound" or simply "compound." In a preferred set of embodiments, the compound has a molecular weight less than 700, 600, 500, 400 or 300 Daltons. In another set of embodiments, the compound comprises equal to or less than 30, 20, 15 or 12 carbon atoms, and preferably includes more than 3 carbon atoms. In yet another set of embodiments, the compound comprises from 4 to 12 carbon atoms. Non-limiting examples of compounds based upon aliphatic moieties include: 4-chloro-4-oxobutanoic acid, 5-chloro-5-oxopentanoic acid, 6-chloro-6-oxohexanoic acid, 7-chloro-7-oxoheptanoic acid, 8-chloro-8-oxooctanoic acid, 9-chloro-9-oxononanoic acid, 10-chloro-10-oxodecanoic acid, 11-chloro-11-oxoundecanoic acid, 12-chloro-12-oxododecanoic acid; 3-(chlorocarbonyl)cyclobutanecarboxylic acid, 3-(chlorocarbonyl)cyclopentane carboxylic acid, 2,4-bis(chlorocarbonyl)cyclopentanecarboxylic acid, 3,5-bis(chlorocarbonyl) cyclohexanecarboxylic acid and 4-(chlorocarbonyl)cyclohexanecarboxylic acid. Non-limiting examples of compounds based upon arene moieties include: 4-(chlorocarbonyl) benzoic acid, 3,5-bis(chlorocarbonyl)benzoic acid, 7-(chlorocarbonyl)-2-naphthoic acid and 5,7-bis(chlorocarbonyl)-2-naphthoic acid. Additional examples of applicable compounds include branched analogs of the preceding compounds along with analogs including additional acyl halide functional groups or carboxylic acid functional groups.

The selection of hydrocarbon solvent is not particularly limited and combinations of multiple solvents may be used. The solvent is preferably a liquid at 20° C. (101 kPa). The solvent preferably has a water solubility of less than 800 ppm (and more preferably less than 500, 400, 300, or 200, or in some embodiments, less than 150 ppm). As used herein, the term "water solubility" refers to the concentration of water that is soluble in a chosen hydrocarbon solvent measured at 20° C. (101 kPa) as measured by ASTM D4928-11. Non-limiting examples of applicable hydrocarbon solvents include: paraffins (e.g. hexane, cyclohexane, heptane, octane, dodecane), isoparaffins (e.g. ISOPAR™ L), aromatics (e.g. benzene, 1,3,5-trimethylbenzene, toluene) and halogenated hydrocarbons (e.g. FREON™ series, chlorobenzene, di- and trichlorobenzene).

Tri-hydrocarbyl phosphate compounds applicable in the present invention include those represented by Formula (I):

Formula (I)

wherein "P" is phosphorous, "O" is oxygen and $R_1$, $R_2$ and $R_3$ are independently selected from hydrogen and hydrocarbyl groups comprising from 1 to 10 carbon atoms, with the proviso that no more than one of $R_1$, $R_2$ and $R_3$ are hydrogen. $R_1$, $R_2$ and $R_3$ are preferably independently selected from aliphatic and arene groups. Applicable aliphatic groups include both branched an unbranched species, e.g. methyl, ethyl, propyl, isopropyl, butyl, isobutyl, pentyl, 2-pentyl, 3-pentyl, cyclopentyl, hexyl, 2-ethylhexyl, cyclohexyl, etc.; however, alkyl groups having from 3 to 10 carbon atoms are preferred. Applicable arene groups include phenyl and napthyl groups. Specific examples tri-hydrocarbyl phosphate compounds include: tripropyl phosphate, tributyl phosphate, tripentyl phosphate, trihexyl phosphate, triphenyl phosphate, propyl biphenyl phosphate, dibutyl phenyl phosphate, butyl diethyl phosphate, dibutyl hydrogen phosphate, butyl heptyl hydrogen phosphate and butyl heptyl hexyl phosphate.

The solution may further include additional constituents including a polyfunctional acyl halide compound including an aliphatic or arene moiety substituted with a plurality of acyl halide functional groups. Non-limiting examples include: $C_4$ through $C_{12}$ alkanes (e.g. succinyl, glutaroyl, adipoyl, heptanedioyl, octanedioyl, nonanedioyl, decanedioyl, undecanedioyl and dodecanedioyl di and tri chloride), cycloalkanes (e.g. cyclopropane tri carboxylic acid chloride, cyclobutane tetra carboxylic acid chloride, cyclopentane tri carboxylic acid chloride, cyclopentane tetra carboxylic acid chloride, cyclohexane tri carboxylic acid chloride, tetrahydrofuran tetra carboxylic acid chloride, cyclopentane dicarboxylic acid chloride, cyclobutane dicarboxylic acid chloride, cyclohexane di carboxylic acid chloride, tetrahydrofuran dicarboxylic acid chloride, cyclohexane dichloride, cyclohexane-1,3,5-tricarbonyl trichloride, and decahydronaphthalene-2,6-dicarbonyl dichloride. Non-limiting examples of reactants based upon arene moieties include: terephthaloyl dichloride, isophthalic acid chloride, benzene-1,3,5-tricarbonyl trichloride and naphthalene-2,6-dicarbonyl dichloride. Additional examples of reactants include branched analogs of the preceding compounds along analogs including additional acyl halide functional groups.

The aforementioned constituents are combined to form a solution comprising at least 80 v/v % hydrocarbon solvent, and in some embodiments at least 90 v/v %, 92 v/v % or 95 v/v % hydrocarbon solvent. In one set of embodiments, the hydrocarbon compound is provided a concentration of at least 0.01 wt %, 0.02 wt %, 0.03 wt %, 0.04 wt %, 0.05 wt %, 0.06 wt % or 0.1 wt %. In another set of embodiments, the solution comprises from 0.01 to 5 wt %, 0.02 to 2 wt %, 0.04 to 2 wt % or 0.05 to 2 wt % of the hydrocarbon compound. In yet another set of embodiments, the solutions comprises from 0.01 to 10 wt % of the tri-hydrocarbyl phosphate compound. The aforementioned constituents may be combined and mixed within a reaction vessel at room temperature.

In many embodiments, the hydrocarbon compound has a solubility limit of less than 1 wt. % in the hydrocarbon solvent, and in some embodiments less than 0.1 wt. %, 0.05 wt %, 0.02 wt % and still others less than even 0.01 wt %. While not wishing to be bound by theory, it is believed that the subject class of tri-hydrocarbyl phosphates increases the solubility of the subject hydrocarbon compounds within the hydrocarbon solvent (e.g. increase of at least 10%). Hydrocarbon-based solutions including relatively higher concentrations of the subject hydrocarbon compounds are useful in a variety of applications including coating operations to prepare polyamides.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention. For purposes of this description, the terms "acyl halide" and "acid halide" have the same meaning. While much of the description has focused upon acyl chlorides, non-chloride halides are also included. The term "solubility limit" refers to the point at which no additional amount of a constituent, (e.g. water, reaction product, hydrocarbon reactant) is miscible or dissolvable with the hydrocarbon solvent or solution, as measured at 20° C. and 101 kPa. Unless otherwise stated, all solubility related parameters are determined at 20° C. and 101 kPa.

EXAMPLES

Preparation of mono-hydrolyzed polyfunctional acid chlorides:
High purity mono-hydrolyzed polyfunctional acid chlorides can be obtained via a variety of routes, including for example, preparing a starter solution by combining a polyfunctional acid chloride (many of which are commercially available including for example, trimesoyl chloride (TMC) and isophthaloyl chloride (IPC)), trialkylphosphate (e.g. tributylphosphate (TBP) and triethylphosphate, (TEP)), and trace levels of water in 100 mL of non-polar solvent in quantities described as separate entries in the table below. The starter solution is allowed to stir for 14-20 hours after which time an additional 1 g of the polyfunctional acid chloride and 0.0076 mL of water is added. The solution is allowed to stir for 1-2 hours and an additional 0.0076 mL of water is added. This is repeated until a total of 4 additions of 0.0076 mL of water are added to the starter solution. During the reaction, the mono-hydrolyzed polyfunctionalized acid chloride product precipitates out of the solution. The white precipitate can be collected using filter paper and washed repeatedly with fresh solvent yielding high purity mono-hydrolyzed polyfunctional acid chloride.

TABLE 1

| Example No. | Acid Chloride type | wt % | Additive type | wt % | Solvent | Water (ppm) | Product Selectivity (%) |
|---|---|---|---|---|---|---|---|
| 1-1 | TMC | 1.2 | TBP | 0.56 | Isopar L | 100 | 99 |
| 1-2 | IPC | 1.0 | TBP | 0.48 | Isopar L | 20 | 100 |
| 1-3 | TMC | 2.0 | TEP | 0.65 | Isopar L | 20 | 100 |
| 1-4 | TMC | 3.9 | TEHP | 1.30 | Isopar L | 20 | 94.8 |
| 1-5 | TMC | 2.0 | TBP | 0.65 | 90/10 Isopar L/toluene | 20 | 100 |

Solubility measurement of acid chlorides containing one carboxylic acid moiety in hydrocarbon solvents with and without solubility enhancing additives:
Saturated solutions of sample acid chlorides containing carboxylic acid moieties were prepared in hydrocarbon solvents with and without the presence of trialkylphosphate additives by adding more sample than will dissolve in the solvent and decanting the saturated solvent from the undissolved precipitate. The saturated solutions were evaluated by proton NMR. Deuterated Isopar L is not commercially available, thus all spectra were acquired in the unlocked condition using regular Isopar L. Because of the very high proton concentration in running a non-deuterated solvent, 60° pulse and minimum receiver gain were used to avoid receiver overflow. A relaxation delay of 8 seconds was used for complete signal recovery between scans. The spectral width was set to 20 ppm and the center of the spectrum was set to 5 ppm. Depending on the concentrations of the species of interest, 64-256 scans were used for signal averaging.

An example of the spectra analysis and calculations used to determine the solubility is provide below for an Isopar solution of mono-hydrolyzed trimesoyl chloride (mhTMC) with and without TBP. The area of the Isopar L peaks between 0.75 and 2.0 ppm were measure and divided by 26 (which represents the average H's present in Isopar L, assuming a molecular formula of $C_{12}H_{26}$) and multiplied by 170.33, the formula weight of $C_{12}H_{26}$. The peak area of the aromatic acid chlorides containing carboxylates are between 8.9-9.2 ppm and are well resolved from the Isopar solvent. The integration of one of the assigned peaks (for example, the triplet of mono-hydrolyzed TMC at 9.0 ppm represents a single proton) was used to determine the relative weight of the sample in the Isopar L solvent. The integration is divided by the number of protons it represents and multiplied by the formula weight of the compound it represents (for example, the triplet of mono-hydrolyzed TMC at 9.0 ppm would be divided by 1 and multiplied by 247.03 g/mol). The wt % of mono-hydrolyzed TMC in the saturated solution is determined by dividing the value obtained for mono-hydrolyzed TMC by the value obtained for Isopar L.

In the presence of tributylphosphate (TBP), the Isopar L value must be corrected since a few protons of TBP cannot be resolved from the Isopar L peaks. This is done by integrating the —OCH$_2$-protons of TBP which are well resolved at ~4.05 ppm, dividing this value by 6 (for 6 protons). This area value is then multiplied by 21 (represents the three —CH$_2$CH$_2$CH$_3$ that are unresolved from the Isopar L peak) and subtracted from the peak area of Isopar L.

TABLE 2

| Example No. | Carboxylic acid | Solvent | Solubility (wt %) |
|---|---|---|---|
| 2-1 | mhTMC | Isopar L | 0.02 |
| 2-2 | mhTMC | Isopar L + 1 wt % TEP | 0.2 |
| 2-3 | mhTMC | Isopar L + 1 wt % TEHP | 0.11 |
| 2-4 | mhTMC | 80/20 Isopar L/Toluene + 0.25 wt % TBP | 0.29 |
| 2-5 | mhTMC | 80/20 Isopar L/Toluene | 0.05 |
| 2-5 | mhIPC | Isopar L | <0.02 |
| 2-6 | mhIPC | Isopar L + 0.47 wt % TBP | 0.29 |

The invention claimed is:

1. A method for increasing the solubility of a hydrocarbon compound comprising an aliphatic or arene moiety substituted with at least one acyl halide and at least one carboxylic acid functional group within a hydrocarbon solvent, wherein the method comprises the step of preparing a solution comprising:

i) at least 80 v/v % of the hydrocarbon solvent,
   ii) the hydrocarbon compound, and
   iii) a tri-hydrocarbyl phosphate compound represented by:

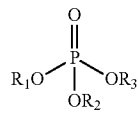

wherein $R_1$, $R_2$ and $R_3$ are independently selected from hydrogen and hydrocarbyl groups comprising from 1 to 10 carbon atoms, with the proviso that no more than one of $R_1$, $R_2$ and $R_3$ are hydrogen;
   wherein the concentration of the hydrocarbon compound is greater than its solubility limit within the solvent but less than its solubility limit in the solution.

2. The method of claim 1 wherein the hydrocarbon compound and tri-hydrocarbyl phosphate compound are provided in a molar ratio of from 1:1000 to 2:1.

3. The method of claim 1 wherein the molar ratio of the hydrocarbon compound and tri-hydrocarbyl phosphate compound is from 1:100 to 1:1.

4. The method of claim 1 wherein the solution comprises at least 0.02 weight percent of the hydrocarbon compound.

5. The method of claim 1 wherein the solution comprises at least 0.05 weight percent of the hydrocarbon compound.

6. The method of claim 1 wherein the hydrocarbon compound comprises equal to or less than 30 carbon atoms.

7. The method of claim 1 wherein the hydrocarbon compound comprises from 4 to 12 carbon atoms.

8. The method of claim 1 wherein the hydrocarbon compound comprises a single carboxylic acid functional group.

9. The method of claim 1 wherein the hydrocarbon solvent has a water solubility of less than 150 ppm.

10. The method of claim 1 wherein $R_1$, $R_2$ and $R_3$ are independently selected from: aliphatic and arene groups.

11. The method of claim 1 wherein the solution further comprises a polyfunctional acyl halide compound comprising no carboxylic acid functional groups.

* * * * *